United States Patent [19]

Neely et al.

[11] Patent Number: 5,670,460
[45] Date of Patent: Sep. 23, 1997

[54] METHOD AND COMPOSITION FOR ENHANCING HYDROCARBON PRODUCTION FROM WELLS

[76] Inventors: Jerry S. Neely, 2805 N. Dustin; Richard D. Neely, 201 McDonald Rd., both of Farmington, N. Mex. 87401

[21] Appl. No.: 587,040

[22] Filed: Jan. 16, 1996

Related U.S. Application Data

[63] Continuation-in-part of Ser. No. 95,156, Jul. 20, 1993, abandoned.

[51] Int. Cl.$^6$ .............................. C09K 7/06; C09K 7/02; E21B 37/06
[52] U.S. Cl. .................. 507/203; 507/239; 507/260; 507/261; 507/268; 507/929; 507/930; 507/931
[58] Field of Search ................................ 507/203, 239, 507/240, 260, 261, 265, 266, 267, 268, 927, 929, 930, 931

[56] References Cited

U.S. PATENT DOCUMENTS

| | | | |
|---|---|---|---|
| 2,753,939 | 7/1956 | Carpenter et al. | 166/41 |
| 2,817,635 | 12/1957 | Goldman et al. | 166/309 |
| 3,241,614 | 3/1966 | Bertness | 166/41 |
| 3,402,770 | 9/1968 | Messenger | 166/40 |
| 3,437,146 | 4/1969 | Everhart et al. | 166/303 |
| 3,718,586 | 2/1973 | Rollo et al. | 166/41 |
| 4,436,638 | 3/1984 | Walker et al. | 166/301 |
| 4,614,235 | 9/1986 | Keener et al. | 166/301 |
| 4,614,236 | 9/1986 | Watkins et al. | 166/309 |
| 4,925,497 | 5/1990 | Thierheimer, Jr. | 134/40 |

OTHER PUBLICATIONS

Milton J. Rosen, 'Surfactants and Interacial Phenomena', Published 1978 by John Wiley & Sons (N.Y.), see pp. 20–21.

*Primary Examiner*—Joseph D. Anthony
*Attorney, Agent, or Firm*—Joseph H. Roediger

[57] ABSTRACT

A concentrate for use with an oil or water carrier for injection into a well to enhance production and a method of well treatment are disclosed. The five part concentrate contains xylene, an aliphatic hydrocarbon solvent such as kerosene, a non-ionic emulsifier, a non-ionic surfactant and an amphoteric detergent. The xylene and kerosene create a solvent hole in the materials restricting flow. The surfactant expands the holes while the detergent and emulsifier assist in dispersing the removed material to thereby stimulate production from the well. The injection of the concentrate and carrier mixture can take place during shut-in of the well or during continued production.

9 Claims, No Drawings

METHOD AND COMPOSITION FOR ENHANCING HYDROCARBON PRODUCTION FROM WELLS

This application is a continuation-in-part application of our application Ser. No. 08/095,156, filed Jul. 20, 1993 and entitled Method and Composition for Enhancing Hydrocarbon Production from Wells now abandoned.

BACKGROUND OF THE INVENTION

This invention relates to the enhancement of production from oil and gas wells by the removal of material such as wax and scale which tend to plug the well and retard the flow of hydrocarbons from the production zone.

The presence of flow restrictions in oil and gas wells which tend to reduce the production rate over a period of time is a problem that has long plagued the production industry. Typically, the fluid flowing from the production zone leaves solid residues, both inorganic and organic, in the portion of the formation proximate the well and in the tubing, piping, valves and the like which form the well structure.

The deposits common to fluid hydrocarbon production are comprised not only of the hydrocarbon chains characteristic of paraffin and wax, but also include other components such as water, rust, clay, and additional hydrocarbon compounds. Buildup within the formation, at the production face and within the well equipment occurs over a period of time and can be characterized by a composition that can vary with time. In addition, the production retarding buildup contains materials from the interleaved and adjacent formations. As a result, the removal of production-reducing buildup by chemical methods is difficult and often unpredictable. Specific treating agents such as xylene are known to dissolve asphaltenes and paraffins, but have limited effectiveness on built up deposits containing inorganic materials. Furthermore, some organic solvents are ineffective with asphaltenes. In U.S. Pat. No. 3,437,146 a process for removing paraffin deposits from a producing well utilizes the injection of heated xylene to enhance production.

Since the use of a single agent is likely to be effective only in specific instances which are empirically determined through field testing, the use of a combination of ingredients to treat solid phase hydrocarbons that are built up around the face of the producing formation has been advocated. For example, a method relying on the injection of an oil and water emulsion in combination with an inert gas and surface active agents to promote removal of the buildup is described in U.S. Pat. No. 4,775,489. Another example of the use of a combination of ingredients is the multi-purpose solvent for the removal of production-reducing buildup in the well described in U.S. Pat. No. 3,402,770 wherein xylene is combined with an acid and a liquid having mutual solubility for oil and water. The liquid is either an alcohol or an ether. The three components are mixed and injected into the well and after a period of time removed along with dissolved materials. The recommended organic solvent is carbon disulfide with benzene and xylene cited as alternative solvents. The objective of this reference is to provide a single phase liquid that can be tested on site and its composition then adjusted based on local conditions. The three component solvent is stated to dissolve both organic accumulations, such as oil and asphalt, as well as inorganic accumulations such as scale or silt. The reference states that the acids are required for the dissolution of the inorganic deposits. Byproducts formed as a result of the reaction between the oil and the acid are retained in solution according to the reference to limit interference with the elimination of the production-reducing buildup. The reference further states that other additives such as detergents, surfactants or deemulsifiers can be added to the solvent to aid in keeping all the materials in solution. As noted in the references, this composition requires an acid and therefore tends to corrode all the metal parts and piping that it encounters. Furthermore, the use of quantities of acid being pumped into a well is likely to encounter environmental objections and is to be avoided. In applications where the chemical treatments contain hazardous materials or are incompatible with the subsequent processing equipment, considerable attention is directed to the recovery and handling of the treatment fluid.

Accordingly, a major objective of the present invention is the provision of a well treatment fluid to provide enhanced production rates from oil and gas wells without requiring the use of acid components or other potentially hazardous materials. In addition, the present composition and the method of applying same to a well can be utilized effectively to remove hydrocarbon-based and water-based solids in the well. Further, the present invention provides a concentrate that can be utilized with either a water or oil carrier. The components of the concentrate are compatible with typical downstream processing techniques so that segregation and separate recovery of the well treatment fluid after treatment is not required. Thus, the need for separate disposal of the fluid is obviated.

SUMMARY OF THE INVENTION

The enhancement of production from oil and gas wells obtained by the practice of the present invention is provided by the addition of a concentrate to a carrier fluid. The combination is injected into the well. The injection can be completed in a short interval when the well is rendered nonproductive or can occur concurrently with production over a longer period of time.

The concentrate of the present invention comprises five components. One component is an aromatic hydrocarbon component containing one or more isomers of xylene. The ability of xylene to promote the solubilizing of complex hydrocarbons from the solid phase is recognized. The xylene component provides the initial interaction of the treatment fluid with the solid buildup by establishing an attraction bond at the surface of the solid phase hydrocarbons found in the formation and well.

The second component is an aliphatic hydrocarbon solvent which is found to expand the softening or solution effect of the xylene when the hydrocarbon deposit has been penetrated by the xylene. During use, the surfaces of the plugging material are partly dissolved to expose additional material and are found to be softened by the combination of the xylene and aliphatic hydrocarbon. The extended chain of the aliphatic hydrocarbon solvent is responsible for the continued solution of the complex hydrocarbons in the plugged material. In general, the higher the molecular weight of the aliphatic hydrocarbon solvent, the greater the absorptive quality for the hydrocarbon deposit dissolved by the xylene. The xylene and aliphatic hydrocarbon solvent are both present in the concentrate in the range of 20 to 60 percent by weight.

The concentrate further includes an amphoteric amide detergent which aids in the solution of hydrophobic and hydrophilic molecules into each other. The detergent continues the dissolution of the hydrocarbons so that they may be removed from proximity to the surface of the deposit.

This component is a link in the sequence of activity at the continually eroding surface of the deposit that takes an insoluble hydrocarbon to a carrier molecule and out of the formation. The detergent is present in the concentrate in the range of 2 to 20 percent by weight. The fourth component of the concentrate is a non-ionic surfactant, such as sorbitan monooleate which is soluble in most oils and assists in the solution of the hydrocarbons into the carrier. In the case of a water carrier for the concentrate or formations that contain significant amounts of water, this component works with the detergent and a non-ionic emulsifier to trap hydrocarbons in a disbursed and soluble form for transport out of the formation. In the case of an oil carrier, the transport of the disbursed hydrocarbon molecules occurs through the action of the hydrocarbon carrier. However, in cases where a water carrier is used, the solubilized mass is disbursed via an emulsion augmented by the effect of the detergent and surfactant. The non-ionic surfactant is present in the range of 2 to 20 percent by weight of concentrate.

The final link in the chain of events that places the formation-plugging deposits into a physical state that allows their transport out of the formation via the oil or water carrier is the fifth component, a non-ionic emulsifier. The emulsifier is present in the range of 2 to 30 percent by weight of the concentrate. The emulsifier permits the hydrocarbons that have been removed from the solid phase to move into the water carrier. The emulsifier maintains the removed hydrocarbon molecules in suspension or solution until removal from the local environment proximate to the surface of the deposit.

The five components of the concentrate complement each other in attacking and dissolving formation plugs and softening scale buildup causing it to break free to thereby increase the flow of product from an oil or gas producing zone of formation. Furthermore, the concentrate provides a coating on exposed surfaces of the well structure which reduces the rate at which scale builds up during resumed production. The concentrate also reduces surface tension to enhance flow during resumed production. These effects persist for a period during resumed production thereby increasing the interval between treatments. In general, the steps of the process include first determining the type of deposited material plugging the well or the adjacent region of the production zone. After obtaining the information, a selection is made between an oil or water carrier. The concentrate is then added to the selected carrier and the combination is injected into the well. In cases where there are high levels of oil sludge or paraffins, the carrier utilized is oil, preferably heated. However, if there is a high level of mixed scales and water-based sludges, then the carrier is water, preferably heated. The concentrate is formulated in a basic mixture and separately contained.

The present invention utilizes materials having a low level of environmental danger. The solvents utilized possess a higher flash point than many hydrocarbon solvents, such as carbon disulfide, recommended by one of the cited references for use in well treatment. The aliphatic hydrocarbon solvent is normally chosen for low flammability and cost, which favors kerosene. The remaining three constituents of the concentrate are generally recognized not to pose environmental problems. It is significant that the present invention does not require that large quantities of acid be handled and later injected into the well.

Further features and advantages of the invention will become more readily apparent from the following detailed description of preferred embodiments.

DESCRIPTION OF PREFERRED EMBODIMENTS

The present invention is directed to a composition for treating hydrocarbon producing wells and the surrounding formation and the method of providing the treatment. The composition in the form of a concentrate is mixed with an oil or water carrier based on the nature of the down hole accumulations retarding production from the well. The mixture is injected into the well to reduce the impediments to production. After the mixture is pumped into the well and the adjacent formation, the well is shut-in and the mixture begins to take action on the accumulations. After a period of twenty-four to seventy-two hours, the well is allowed to flow back since the injected fluid mixture is captured through the production process. The well is brought into production at an enhanced production rate.

The concentrate of the present invention is comprised of five constituents each of which takes an interactive part in the breakdown and removal of solid buildup from the well and the adjacent portion of the formation. The buildup of solid material can include paraffins and oil sludge as well as scale and water soluble sludge based on the composition of the hydrocarbon being produced, the nature of the producing formation, and the presence of layers of different material in the formation. The concentrate of the present invention is added to different carriers based on an initial analysis of the nature of the conditions at the well.

The concentrate includes an aromatic hydrocarbon solvent containing at least one isomer of xylene in the range of 20 to 60 percent by weight. The properties of xylene as a hydrocarbon solvent are that it is aggressive in making an initial penetration of hydrocarbon-based solid buildup. Xylene has three isomers; ortho, meta and para, based on the position of the $CH_3$ groups on the benzene ring which structurally characterizes the compound. The present invention utilizes one or more of the isomers of xylene with essentially the same beneficial results being attained.

The xylene component aids in establishing an attraction bond between the surface of the solid hydrocarbon found in the formation and the other components of the concentrate. These solids can include coal, carbonaceous shale, asphalt, oil shale, paraffins, waxes, tar and oil sands and geologically-entrained materials. The xylenes begin the solution of complex hydrocarbons by interacting with the wide molecular spacing found in most solid phase hydrocarbons. In addition, the xylenes are partly soluble in water so as to be compatible with different types of carriers.

The second component of the concentrate is an aliphatic hydrocarbon solvent, such as present in kerosene, gasoline and diesel fuel. This component is present in the concentrate in the range of 20 to 60 percent by weight. The aliphatic solvent is a mixture of straight chain and branched chain hydrocarbons and provides for the continued solution of the complex hydrocarbons initially penetrated and softened by the xylene component. After the initial action of the xylene to penetrate and soften the solid hydrocarbon buildup, the aliphatic solvent then further dissolves and softens the plugging material. The use of kerosene as the source of the aliphatic solvent is preferred due to its low flammability and low cost. The higher molecular weight oils are preferred for use as a hydrocarbon carrier to provide the adsorption of dissolved hydrocarbons.

While xylenes are known to be useful in well treatment and the solvent properties of kerosene have been recognized, the combination of the xylene and the aliphatic solvent are found to provide enhanced action in this environment when used with the remaining three components of the concentrate which serve to disperse, suspend and emulsify the hydrocarbons for removal from the formation and the well.

The dispersion of the removed hydrocarbon molecules is aided by the third component which is an amide detergent present in the range of 2 to 20 percent by weight. One detergent component found particularly well-suited for use in the present invention is designated cocoamide diethylamine or DEA and is available commercially as monoamide 3-40A. Other commercially available fatty acid alkanolamide and alkanolamine detergents tested for use in the present invention and found to provide an effective detergent constituent for the present invention are Stanamid LDS, Stanamid KDO, Stanamid SD, Stanamid LDO, Monamid 150DR, Monamid C305 and Monalube 610, all products sold by Imperial Chemical Industries. The overall performance of the concentrate and carrier is found to increase as the weight percentage of the detergent is increased from a 2% lower limit. The upper limit of the range is 20%, with good results being obtained at a midrange of 10% by weight of the concentrate. These detergents are amphoteric in that each is soluble in both water and oil and promotes the dissolution of hydrophobic and hydrophilic molecules into each other. The hydrocarbons dissolved from the formation and the solid hydrocarbon buildup are dissolved or dispersed into the more charged phase which can be the aromatic xylene phase or the water phase. The amide detergent continues the dissolution of the hydrocarbons so that the molecules are removed from the solid phase being treated.

The detergent is one of the five active elements that cooperate to take an insoluble hydrocarbon to the carrier and out of the formation and well. The final removal is produced by the action of this detergent molecule in combination with that of the remaining two components; a nonionic surfactant and a nonionic emulsifier. The detergent and surfactant components are present in the range of 2 to 20 percent by weight of the concentrate. The emulsifier is present in the 2 to 30 percent range.

The nonionic surfactant contains at least one hydroxyl group. Preferred surfactants are sorbitan monooleate and sorbitan monostearate which are found effective in the range of 2 to 20% by weight. This surfactant is highly soluble in most oils and assists in the solution of many types of hydrocarbons into oil-based carriers. The chief task of this component is to assist in the dispersion of the organic material that has been solubilized by the xylenes, kerosene or other aliphatic solvent and the amide detergent into a nonpolar region in the carrier. The dispersion of these molecules facilitates their transport out of the formation by an oil-based carrier. In the situation where a water-based carrier is used or the producing formation being treated contains significant amounts of water, the surfactant molecule works in combination with the detergent and emulsifying components to trap oil and other hydrocarbon molecules in a dispersed solubilized form for transport. By employing a heated water-based carrier the solubilized mass is dispersed via an emulsion/solution augmented by the detergent and surfactant effects of the two other constituents.

The fifth component of the concentrate is a nonionic emulsifier which provides the final link in the series of reaction events that causes the formation-plugging materials, both charged and uncharged molecules, to reach a physical state that permits transport thereof via the oil or water based carriers. The nonionic emulsifier is a polysorbate in the range of polysorbate 20 to polysorbate 80. Polysorbates are polyoxyethylene sorbitan fatty acid esters. Preferred emulsifiers are polysorbates 80 and 60, which are polyoxyethylene sorbitan monooleate and polyoxyethylene monostearate respectively, each with 20 units of polymer as defined in the Merck Index, 14th Edition.

The polysorbate component is water soluble and enables the hydrocarbon molecules that have been removed from the solid phase to move into a water-based or other charged solution. The molecules once freed from the surface that they have adhered to are kept in suspension or solution until removed from the region proximate to the producing formation. Furthermore, the emulsifier serves as an antifoaming agent to aid in the removal of the carrier and the entrained materials from the formation and well.

In use, the components of the concentrate begin to dissolve formation plugs and increase flow from the production zone by a cooperative action which begins with the initial penetration of the xylenes followed by softening and partial dissolution by the aliphatic solvent such as kerosene. In addition, the concentrate acts to soften scale causing it to break free from its substrate and be dispersed in the carrier fluid. The concentrate provides a residual coating on the well structure which serves to retard subsequent scale buildup. By exposing the surfaces of the production-limiting material to the combined action of the detergent and surfactant, the hydrocarbon molecules move from the surface of the mass and they become suspended by the emulsifier in the carrier. The benefits of the novel combination of components in the concentrate in removing hydrocarbon solids, reducing scale deposits and reducing surface tension are apparent from the following results of the injection of the present concentrate and carrier into limited production wells.

| Example I |
|---|
| Gas Well - San Juan County, New Mexico |
| Picture Cliff Formation |

| | |
|---|---|
| Prior Production Rate | 317 MCF/day |
| After Treatment | 509 MCF/day |

| Example II |
|---|
| Oil and Gas Well |
| Sandoval County, New Mexico |
| Dakota Formation |

| | |
|---|---|
| Prior Production Rate | 51 MCF/day |
| | 6.5 Bbl/day |
| After Treatment | 81 MCF/day |
| | 9.5 Bbl/day |

| Example III |
|---|
| Gas and Oil Well |
| Rio Arriba County, New Mexico |
| Mesa Verde Formation |

| | |
|---|---|
| Prior Production Rate | 323 MCF/day |
| | 4.8 BbL/day |
| After Treatment | 538 MCF/day |
| | 6.1 Bbl/day |

| Example IV |
|---|
| Oil and Gas Well |
| Rio Arriba County, New Mexico |
| Gallup Formation |

| | |
|---|---|
| Prior Production Rate | 32 MCF/day |
| | 3.1 Bbl/day |
| After Treatment | 48 MCF/day |
| | 6.7 Bbl/day |

The concentrate used in the above-noted test had the following composition by weight: sorbitan monooleate and cocoamide DEA 4.6%, xylene 36.3%, kerosene 36.3% and polysorbate 80 at 18.2%.

The composition is prepared as a mixture of the components which produces a clear solution or a partially turbid solution based on the relative ranges of the ingredients. There is no known chemical reaction between the ingredients themselves so that the concentrate is stable in the container. No special packaging techniques need be employed to contain the concentrate. Since the concentrate is separately contained, it is normally transported to the well site for addition to the carrier fluid. The preferred mixture is about a fifty-five to 1 ratio or 1 gallon of concentrate to a barrel of carrier fluid.

Prior to the addition of the concentrate to the carrier fluid, determination is made of the type of material plugging the well or production zone and the chemical composition of the produced oil and gas. This allows the selection of an appropriate oil-based or water-based carrier fluid for the well treatment. For example, if the test show a predominance of paraffins, waxes and oil sludges the selection of a heated oil carrier is indicated with additional emulsifier added. Should the tests show a high level of mixed scales and water based sludges then a heated water-based carrier with high levels of detergents and surfactants is indicated. As mentioned, the concentrate can be mixed in a standard compositional range for a particular producing area with the additions and adjustments made in the field if deemed necessary.

The selected carrier is delivered to the wellsite in a conventional "hot oil" truck which can provide a heated carrier fluid. The best results have been attained with a heated mixture of about 175 degrees F. The concentrate is added to the carrier in the "hot oil" pumper truck. The truck is then connected to the well and the mixture is forced down the well and into the surrounding region of the producing formation.

After the working mixture is pumped in, the well is shut off and the mixture allowed to react with the materials in the collection system and the geological formation for up to 96 hours. Then, the well is allowed to flow back and the injected fluids are included in the production stream and normally passed to the subsequent processing facility. As shown by the examples, the well is brought back into production at an enhanced rate. Normally, the process is repeated when production again drops to the operator's economic cut-off level. However, should the well prove difficult to treat or the production rate be found to rapidly drop, the mixture can be injected into the well at a low daily rate to reduce the rate at which production falls through buildup of plugging material.

While the above description has referred to a range of embodiments, it is to be noted that variations may be made therein without departing from the scope of the invention as claimed.

We claim:

1. A concentrate to be added to carrier fluid, the combination of concentrate and carrier being injected into a well to increase the production of fluid hydrocarbons therefrom, said concentrate comprising:

a) an aromatic xylene solvent containing at least one isomer of xylene, said xylene solvent being present in the concentrate at 20 to 60 percent by weight;

b) an aliphatic hydrocarbon solvent at 20 to 60 percent by weight;

c) a polysorbate emulsifier at 2 to 30 percent by weight;

d) a fatty acid ester of sorbitan at 2 to 20 percent by weight; and e) a fatty acid amide detergent at 2 to 20 percent by weight.

2. A concentrate to be added to carrier fluid, the combination of concentrate and carrier being injected into a well to increase the production of fluid hydrocarbons, said concentrate comprising:

a) an aromatic xylene solvent containing at least one isomer of xylene, said xylene solvent being present in the concentrate in the range of 20 to 60 percent by weight;

b) an aliphatic hydrocarbon solvent in the range of 20 to 60 percent by weight;

c) a polysorbate emulsifier in the range of 10 to 30 percent by weight;

d) sorbitan monooleate in the range of 2 to 10 percent by weight; and e) a cocoamide detergent in the range of 2 to 10 percent by weight.

3. The invention in accordance with claim 2 wherein said aliphatic hydrocarbon is kerosene.

4. The invention in accordance with claim 3 further comprising water as a carrier fluid.

5. The invention in accordance with claim 3 further comprising a fluid hydrocarbon of the type produced from the well as a carrier fluid.

6. A concentrate to be added to carrier fluid, the combination of concentrate and carrier being injected into a well to increase the production of fluid hydrocarbons therefrom, said concentrate comprising:

a) an aromatic xylene solvent containing at least one isomer of xylene, said xylene solvent being present in the concentrate at about 36 percent by weight;

b) an aliphatic hydrocarbon solvent at about 36 percent by weight;

c) a polysorbate emulsifier at about 18 percent by weight;

d) sorbitan monooleate at about 5 percent by weight; and e) a cocoamide detergent at about 5 percent by weight.

7. The invention in accordance with claim 6 wherein said aliphatic hydrocarbon is kerosene.

8. The invention in accordance with claim 7 further comprising water as a carrier fluid, said concentrate being added to the carrier fluid in a ratio of about 1 part concentrate to 55 parts carrier fluid by volume.

9. The invention in accordance with claim 8 further comprising a fluid hydrocarbon of the type produced from the well as a carrier fluid, said concentrate being added to the carrier fluid in a ratio of about 1 part concentrate to 55 parts carrier fluid by volume.

* * * * *